United States Patent [19]
Missout et al.

[11] Patent Number: 4,773,607
[45] Date of Patent: Sep. 27, 1988

[54] APPARATUS FOR ACCUMULATING A FILIFORM ELEMENT SUCH AS AN OPTICAL FIBER, AT DIFFERENT SPEEDS

[75] Inventors: Bernard M. Missout; Jean-Pierre Michaux; Jean-Louis Striebig, all of Paris, France

[73] Assignees: SAT (Societe Anonyme de Telecommunications); SILEC (Societe Industrielle de Liaisons Electriques), both of Paris, France

[21] Appl. No.: 29,649

[22] Filed: Mar. 24, 1987

[30] Foreign Application Priority Data

Mar. 28, 1986 [FR] France .............................. 86 04565

[51] Int. Cl.$^4$ ...................... B65H 54/00; B65H 54/80
[52] U.S. Cl. .................................. 242/47; 19/159 R; 28/289; 242/82; 242/83
[58] Field of Search .................. 242/47, 47.01, 82, 83; 226/118; 19/159 R; 28/289

[56] References Cited

U.S. PATENT DOCUMENTS

| | | |
|---|---|---|
| 3,226,794 | 1/1966 | Erb ........................................ 242/47 |
| 3,312,381 | 4/1967 | Guttler et al. ...................... 226/118 |
| 3,703,261 | 11/1972 | Cafer et al. ...................... 242/83 X |
| 4,158,253 | 6/1979 | Gaghan et al. .................... 242/47 X |

FOREIGN PATENT DOCUMENTS

| | | | |
|---|---|---|---|
| 2225371 | 11/1974 | France ................................... | 242/47 |
| 1139085 | 11/1962 | Fed. Rep. of Germany . | |
| 2403548 | 7/1975 | Fed. Rep. of Germany ........ | 242/47 |
| 2417206 | 11/1975 | Fed. Rep. of Germany ........ | 242/82 |
| 2047760 | 12/1980 | United Kingdom ................. | 242/47 |

Primary Examiner—Stanley N. Gilreath
Attorney, Agent, or Firm—Laubscher & Laubscher

[57] ABSTRACT

An apparatus accumulating a filiform element in order to absorb differences in input and output travel speeds of the element, without tangling and damaging the element. Mechanical means located above an accumulation container draw the filiform element at the input speed and wind the filiform element in layers of coils stacked on the bottom of the container following an epicycloid or hypocycloid path. Two stationary concentric rings, respectively, attached to and suspended above the bottom of the container, guide the filiform element unwound at the output speed through the bottom of the container to the outside. The apparatus is particularly designed for a very fine and fragile filiform element such as an optical fiber, and is inserted between a multifibering machine and a cabling line.

18 Claims, 3 Drawing Sheets

APPARATUS FOR ACCUMULATING A FILIFORM ELEMENT SUCH AS AN OPTICAL FIBER, AT DIFFERENT SPEEDS

BACKGROUND OF THE INVENTION

1. Field of the invention

This invention relates to an apparatus for accumulating a filiform element travelling at two different speeds when entering and exiting the apparatus.

2. Description of the Prior Art

Preferably, the filiform element is an optical fiber which leaves a multifibering machine at a first speed and which enters a cabling machine at a second speed. In normal operation, the first and second speeds are equal.

However in pratice it often turns out that the two speeds, although slaved to each other, are sometimes not the same, which results in slowing down of travel in the multifibering machine or the cabling machine, or momentary stoppage of one of the machines for repair, replacement of parts or the like. In any case, slowing or stoppage of one of the machines necessarily means that the other machine experiences the same.

To overcome this operational interdependence of the multifibering machine and the cabling machine, it proves necessary to place an optical fiber accumulation apparatus between the two machines in order to absorb the differences between the first and second speeds, without damaging the optical fiber. Thus if the multifibering machine upstream of the apparatus slows or stops, the quantity of optical fiber accumulated will diminish, and if the cabling machine downstream of the apparatus slows or stops, the quantity of optical fiber accumulated will increase. In practice, the ability of the apparatus to absorb differences and irregularities in the travel speeds will depend on the apparatus storage capacity and therefore essentially on its dimensions.

An accumulation apparatus having the above features is disclosed by German patent application No. 1,139,085. In this apparatus, the filiform element to be accumulated is an iron wire. The apparatus is inserted in a roll line. Upstream of the apparatus the wire passes through a vertical tube followed by an arm tilted in relation to the tube and attached to it, or a truncated funnel coaxial with the tube and connected to it. The tube and the arm or funnel are rotated above a tank in the form of a fixed cylindrical accumulation drum and are driven coaxially to it by a gear train coupled to a motor. The rotation of the arm or funnel thus allows the iron wire to be deposited in stacked circular coils on the bottom of the drum, the wire coils being kept concentric against the cylindrical internal wallside of the drum. The wire is drawn at a second low travel speed through a central orifice in the bottom of the drum.

However, such an apparatus is not usable to accumulate an optical fiber because of the fact that the optical fiber is extremely fine, with a diameter of a few tenths of a millimeter, and can not be concentrically stacked. In practice, the coils of optical fiber sag towards the middle of the coils, causing them to become entangled and thus creating a risk of embrittlement, or even breakage as the fiber is drawn out of the drum. In addition, as will be seen later on, certain special precautions need to be taken when accumulating an optical fiber, in particular with regard to the bend radius imposed on the fiber, which should never exceed a minimum radius below which the physical and mechanical properties to the optical fiber are impaired.

OBJECT OF THE INVENTION

The main object of this invention is to provide an apparatus for accumulating a filiform element, preferably an extremely fine one, allowing tangle and damage-free feeding of the filiform element through the bottom of the container, while at the same time seeking to achieve optimum occupation of the bottom of the container by the accumulated filiform element.

SUMMARY OF THE INVENTION

Accordingly, an apparatus for accumulating a filiform element according to the invention has the filiform element entering the apparatus at the first travel speed and leaving it at the second speed.

The apparatus comprises a container, means located above the container for winding the filiform element travelling at the first speed into layers of coils stacked on the container bottom, and means for guiding the filiform element unwound at the second speed from the bottom of the container through the bottom and underneath the bottom.

The winding means winds the filiform element along an epicycloid or hypocycloid path.

According to another aspect of the invention, the coils accumulated along the path on the bottom have their outer edge held by the wall of the container as well as their inner edge, in order to allow unwinding of the lower coils by gentle sliding over the bottom of the container avoiding all tangling of the coils causing breakage of the filiform element, such as an optical fiber. Accordingly, the guiding means is located in the center of the container and is inside the coils laid along the filiform element winding path. The guiding means comprises a first ring attached to the container bottom, and a second ring substantially located above the container bottom and concentrically surrounding the first ring. The filiform element is unwound through a first gap between the second ring and the container bottom, through a second gap between the rings and via a channel passing through the first ring and the container bottom. The channel is preferably perpendicular to the bottom and axial to the first ring.

BRIEF DESCRIPTION OF THE DRAWING

Other objects and features of the invention will become apparent from the following description of preferred embodiments as illustrated in the corresponding appended drawings in which.

DESCRIPTION OF THE PREFERRED EMBODIMENTS

Figure 1:
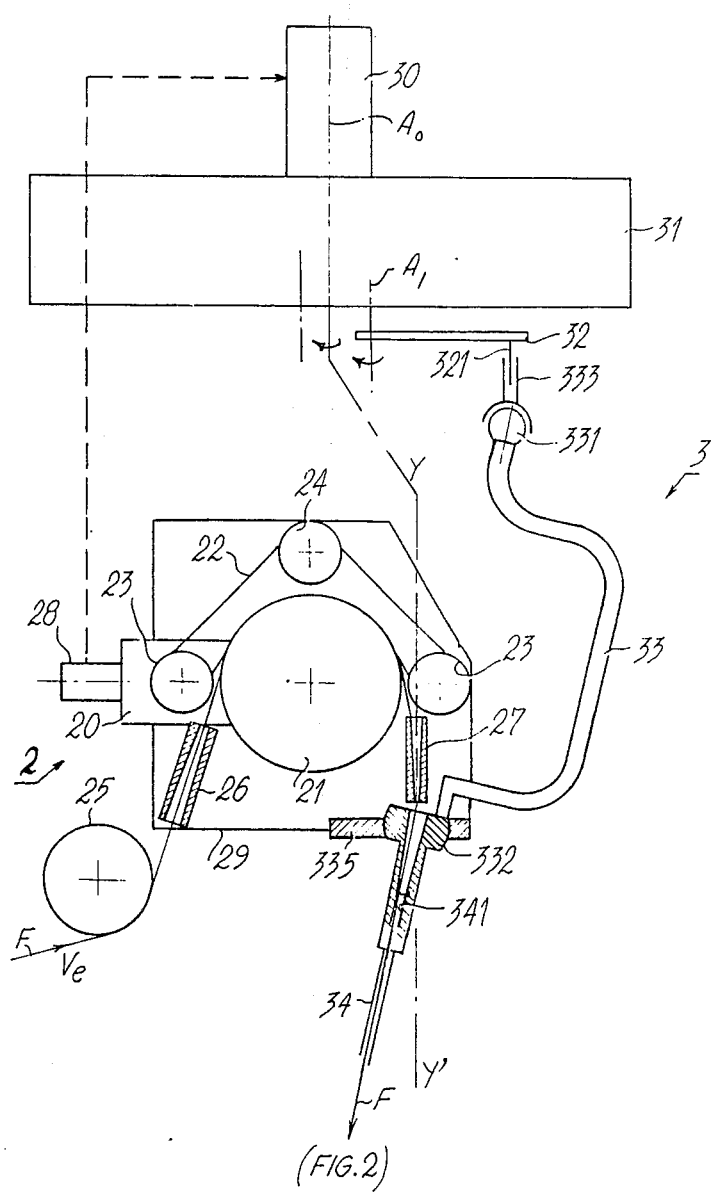
FIG. 1 is a schematic side view, with a partially axial cross-section, of the upper part of an accumulation apparatus according to the invention, the upper part comprising a drive device and a winding device.

As shown schematically in FIGS. 1 and 2, an apparatus for accumulating a filiform element, such as an optical fiber F, to which we will refer hereinafter, comprises an accumulation container in the form of a cylindrical drum 1 or a deck with vertical axis YY'. Above the drum are located a drive device 2 pulling fiber F at an input speed $V_e$, and a winding device 3 for coiling the fiber in container 1 along a predetermined epicycloid or hypocycloid path, or any other type of suitable path allowing correct unwinding of the fiber towards the outside of the container. Device 3 is located on either side of a vertical axis YY' passing through the articulated center of a ball-joint 332 defined hereinafter, and device 2 is located on the side, here the lefthand side, of axis YY' and device 3. Devices 2 and 3 are attached to three pillars 40 of a frame 4 erected on a base 41 carrying container 1. The lower part of the aparatus comprises a return roller 50 upstream of an unwinding device for unwinding the fiber F at an output speed $V_s$, fiber F passing via an axial channel 12 in a central ring hub 10-11 inside the container 1.

Drive device 2 is used to drive the fiber at input speed $V_e$ which is imposed either directly by drive device 2, or by fiber pulling means located upstream of the accumulation apparatus and coupled to the drive device. This upstream means is typically a multifibering machine simultaneously drawing several optical fibers, in order to produce optical fibers from silica roughs for example by passing through an oven and a fiber coating and coating drying device.

As shown in FIG. 1, device 2 comprises a motor 20 driving a pulley 21 around a horizontal shaft. The pulley has a flange having a U-groove over which is stretched a belt or flat continuous strap 22. The belt is tensed by two free rollers 23 aligned following the horizontal diameter of pulley 22 and by a third free roller 24 aligned vertically with and above the pulley so that the belt is flattened against the upper half-circumference of the pulley groove and is driven by the pulley. On leaving the drawing upstream means, fiber F passes under an input roller 25 of the apparatus and passes through a straight entrance tube 26 slightly tilted at 15° to the vertical so that fiber F is routed up and arrives tangentially on pulley 21, between the pulley flange and the left-hand roller 23 and is therefore sandwiched between the belt 22 and the peripheral groove of the pulley 21. Then after running around the top of the pulley 21, fiber F emerges substantially vertically, preferably along the tangent to pulley 21 at the fiber exit point, between pulley 21 and the right-hand roller 23 before descending vertically along axis YY' through a tubular exit guide 27 with a flared entrance located beneath the horizontal plane containing the axles of roller 23 and pulley 21.

Figure 3:
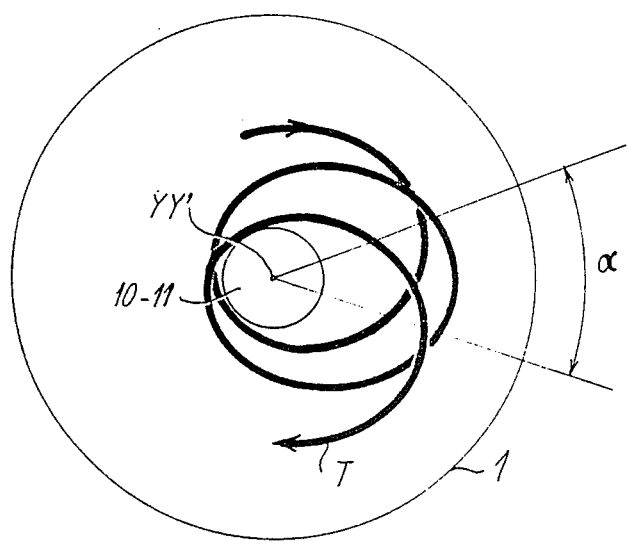
FIG. 3 shows an epicycloid winding path followed by the filiform element in the accumulation container.

The drive device 2 also comprises a speed measurer 28 linked to the shaft of motor 20 so as to slave the rotation speed of a motor 30 included in the winding device 3, and thus the winding speed of fiber F around the central hub 10-11 of drum 1. The winding device 3 winds fiber F in the accumulation drum 1 along a cycloidal path T of the epicycloid or hypocycloid type, as shown in FIG. 3. Such a path T is the result of a combination of rotation of a point M on a horizontal circle $C_1$ having radius $R_1$ around a vertical axis $A_1$ passing through the center of the circle, and the rotation of axis $A_1$ around vertical axis YY' designated by $A_0$ in FIG. 4.

Figure 4:
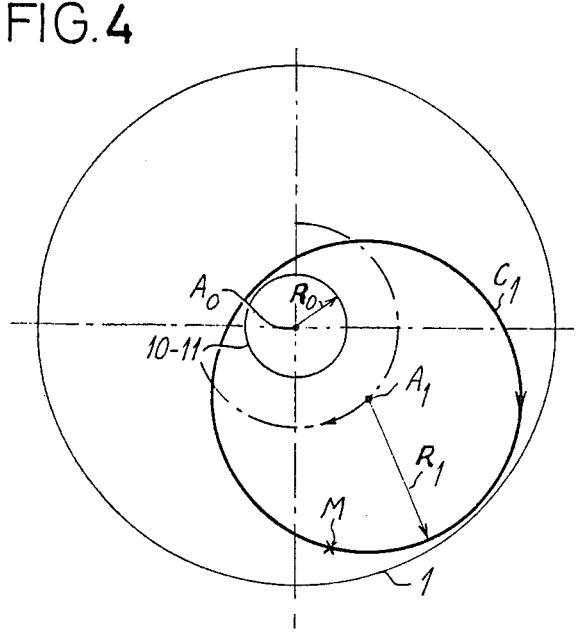
FIG. 4 is a kinematic diagram explaining how the path in FIG. 3 is obtained.

According to FIG. 4, axis YY' passes inside circle $C_1$ so that the interaxial distance (YY', $A_1$) is less than radius $R_1$. In practice, (YY', $A_1$) is less than the internal radius of drum 1, and $R_1$ −(YY', $A_1$) is equal to or substantially greater than the outside radius of the hub 10-11 so that the coils of path T are more or less tangential to the hub, or to a circle concentric with it, and surround it by rotating about axis YY'. Each coil passes above the previously formed coils so that fiber F forms layers of coils around axis YY'. In practice, the rotation speed of point M around axis $A_1$ and the rotation speed of axis $A_1$ around axis YY' are chosen so that the distance between two consecutive coils on the path, shown at the edge of the hub in the illustrated example in FIG. 3, is considerably less than $2\pi R_1$; and that a high number of coils is formed during each revolution of axis $A_1$ around axis YY'.

For example, the following parameters are taken:
drum diameter: 0.55 m $>2$ ((YY', $A_1$) +$R_1$)
drum height: 50 mm
mean diameter of coils: $2R_1$ =0.40 m
outside diameter of hub 10-11: 0.32 m $\simeq 2(R_1$ −(YY', $A_1$))
diameter of fiber F: 0.25 mm
angular offset of coils: $\alpha = 20°$ to 25°.

With the above parameters, the input and output speeds $V_e$ and $V_s$ of the fiber in the accumulation apparatus, approximately several hundred meters per minute, were obtained. It was possible to stock at least 3500 m of fiber, corresponding to a stacking height of approximately 18 mm.

As shown in FIG. 1, a fiber winding device 3 comprises, in its upper part, an epicycloid or hypocycloid gear train 31 whose casing is attached to the upper ends of frame pillars 40 and supports the motor 30 driving the train 31. A satellite subjacent to train 31 and equivalent to circle $c_1$ has a crank 32 at its edge, whose cycloidal movement is transmitted to a U-shaped arm 33. An upper end of the arm 33 is conneced to a lower end 321 of the crank 32 by a Cardan joint 331. An upper tubular portion 333 of the Cardan joint 331 slides vertically and is guided in this movement by the lower end 321 of the crank. A lower end of the arm 33 forms a hemispherical ball-joint 332. The ball-joint is housed in a bearing 335 fixed to a bracket 29 supporting the pulley 21, the rollers 23 and 24 and the guides 26 and 27, the bracket being fixed to the frame pillars. The ball-joint 332 is articulated along axis YY' and below the guide 27. The arm 33 is U-shaped so that it does not interfere with the drive device 2 when the crank 32 passes above it, to the left of axis YY', as shown by the dashed in FIG. 1.

The winding device 3 also comprises a long thin tube 34 which in practice is about 1.30 m long, so that the fiber leaving the guide 27 descends and slides in the tube thanks to the thrust exerted by the pulley 21 and/or by gravity in the drum, whatever the position of lower end 342 of the tube 34 in relation to the hub 10-11 and the sidewall of the drum 1. An upper end 341 of the tube 34 is broadly flared under the guide 27 and is diametrically inserted in ball-joint 332 and conventionally fitted in it. The lower end 342 adjoins the upper open base of the drum 1 and describes the paths as schematically shown in FIG. 3. There is a minimum free distance between the upper stacking surface and the end 342 of the tube, this distance depending on the shape of the end 342, which may be flared and/or curved. The speed of the motor 30 is slaved to that of the motor 20 via the speed measurer 28, so that the fiber F is laid in the drum in accordance with the chosen path T.

Figure 2:
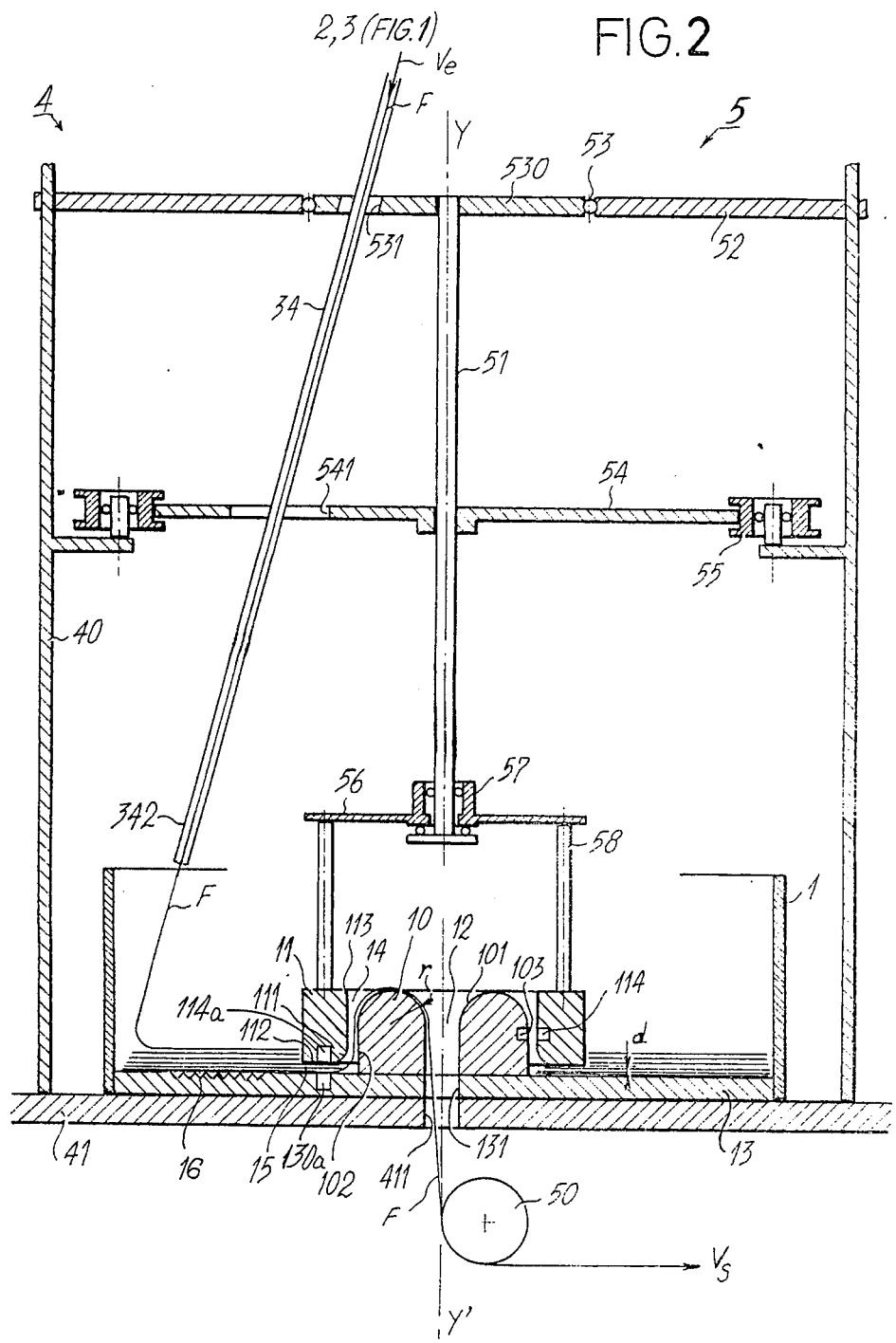
FIG. 2 is an axial cross-section schematic view of the lower part of the accumulation apparatus comprising an accumulation container upstream of an unwinding device.

As shown in detail in FIG. 2, the drum 1 is fixed to the horizontal base 41 of the frame and centered on axis YY′, beneath tube 34. The inside surface of the bottom 13 of the drum has a coefficient of friction compatible with correct unwinding of the fiber, for example as obtained with circular grooves 16 having a depth approximately equal to one tenth of the diameter of the fiber. In other embodiments, the coefficient of friction is obtained using a fluidized or liquid bed, for example such as mercury, deposited on the bottom 13 and having a suitable density.

The unwinding of fiber F wound around the hub 10-11 of the drum consists in exerting a traction force in a direction located in the plane of the lower coil of the coil stack and in guiding and extracting the fiber through the center of the bottom of the drum 13 and the frame base 41 and out beyond the bottom and the base.

The hub of the drum comprises an inner cylindrical ring 10 and an outer cylindrical ring 11 concentric with axis YY′ for guiding fiber F between themselves from the bottom of the drum supporting the accumulated coils, to the outside of the drum.

The inner ring 10 is fixed against the inner surface of the bottom 13. The upper part of ring 10 has a semicircular convex axial cross-section 101 of radius r substantially equal to half the height of ring 10. The central channel 12 is made in ring 10 and has an upper end flared at the top formed by the semicircular cross-section, and a lower end opening out under the frame through axial orifices 131 and 411 made in the bottom 13 and the base 41.

The outer ring 11 against which the inside edge of the optical fiber coils partially presses, is stationary and suspended above the bottom 13 at a predetermined distance d, a few millimeters greater than the diameter of th fiber F so that the lower coil resting on the bottom 13 can be unwound. The lower inner edge of ring 11 has a quarter-circle convex axial cross-section with a radius substantially equal to r, tangentially connecting an outer flat lower edge 112 parallel to the bottom 13 and a cylindrical upper edge 113 concentrically surrounding an upper portion of the outer cylindrical surface 102 of the inner ring 10. A ring-shaped gap 14 is thus created between surfaces 113 and 102 and has a radial width substantially equal to d. The circular surfaces 111 and 101 have a bend radius r, like that of the pulley 21, considerably larger than the minimum bend radii, about 5 cm, which can be safely undergone by an optical fiber without altering its physical characteristics. Typically, r is between 200 and 400 fiber diameters, for example r=9.5 cm. It is noted that all the bend radii of the fiber following its path in the accumulation apparatus are also greater than the minimum bend radius of the optical fiber.

The fiber F is thus unwound from the downstream end of the lower coil of the stack of coils, passing through a first gap 15 between the lower horizontal surface 112 of the outer ring 11 and the upper surface of the bottom 13, following the quarter-circle edge 111, passing through gap 14 between the rings, following the upper semicircular edge 101, passing vertically through the central channel 12 and orifices 131 and 411 and exiting from the underneath of the base 41. Fiber F then passes under roller 50 and enters a cabling line downstream of the accumulation apparatus, drawing and unwinding the fiber from the drum at an output speed $V_s$ which can be different from input speed $V_e$. The cabling line comprises driving means for drawing at the same speed $V_s$ several fibers emanating from several accumulation apparatuses according to the invention, with the aim, for example, of introducing the fibers into the grooves of a grooved flat or grooved cylindrical core, or inside a tube in order to constitute an optical fiber cable.

As also shown in FIG. 2, the accumulation apparatus also comprises, beneath the ball-joint bearing 335 and above drum 1, a set of plates 5 for guiding the tube 34 and suspending the outer ring 11 to prevent rotation and axial movement of ring 11, despite the movement of the fiber guiding tube 34 above drum 1 and around vertical axis YY′.

The ring 11 is prevented from rotating by a means of magnetic attraction exerted by permanent magnets 114 and 103 having opposed unlike poles and of the ring-shaped gap 14, and/or by permanent magnets 114a and 130 having opposed unlike poles and buried in the outer ring 11 and the drum bottom 13, respectively, on either side of ring-shaped gaps, as illustrated in FIG. 2.

Between the ball-joint bearing 335 and the hub 10-11 is located rotating a central vertical shaft 51. Shaft 51 is held coaxial with axis YY′ by means of an upper horizontal circular plate 52 having an external periphery fixed to the frame pillars 40 and an internal central ball bearing race 53, and by means of an intermediate horizontal circular plate 54 located at substantially mid-height between plate 52 and the hub 10-11 and held coaxial with axis YY′ by grooved free peripheral wheels 55 attached to the frame pillars 40 by brackets. The shaft 51 has an upper portion attached to an inner ring 530 of the ball bearing in the race 53, and an intermediate portion attached to the intermediate plate 54, so that the shaft 51 turns freely about its axis YY′. At the lower portion of shaft 51, above the drum hub, a small lower horizontal plate 56 is coupled to the shaft 51 via a suspended socket 57 fitted with two ball bearings. Vertical pins 58 attached to plate 56 suspend the outer ring 11 above the drum bottom 13, separated from it by distance d. In order to introduce the fiber F under ring 11, in gap 15, and between rings 11 and 10, in gap 14, before starting operation of the accumulation apparatus, the socket 57 can slide axially along shaft 51, which means that ring 11 can be displaced above the bottom 13 to facilitate insertion of the end of the fiber.

In order to avoid hindering the epicycloid or hypocycloid movement of the long fiber guide tube 34 around axis YY′, the tube 34 gently slides through a small radial slot 531 cut into the lower ring 530 of the ball bearing race 53, and a longer radial slot 541 in the intermediate plate 54. In operation, the tube 34 slides through slots 531 and 541 and rotates ring 530, plate 54 and shaft 51, without rotating ring 11 and lower plate 56 which are rotatably connected with shaft 51 by socket 57. Ring 11 remains stationary thanks to the magnetic coupling between magnets 103 and 114 while the shaft 51 rotates.

It is to be understood that the preferred embodiments shown and described herein are illustrative of the principles of the invention only and that modifications can be implemented by those skilled in the art without departing from the scope and spirit of the invention. The drive device 2 can comprise one or more V-belts instead of belt 22 and/or pulley 21, or be combined with them. The epicycloid or hypocycloid driving means can be designed with electric, hydraulic or pneumatic actuators. Ring 11 could be held above the drum bottom 13 by magnetic or pneumatic lifting means.

In addition, althrough the apparatus according to the invention is in particular designed for accumulating an extremely fine and fragile filiform element, this apparatus can be used whenever necessary to accumulate a flexible filiform element in a manufacturing line comprising an upstream part in which the filiform element travels at a speed likely to differ from that in a downstream part of the line. For example, the filiform element can be a metal or plastic tube or wire, a textile, synthetic or organic wire or fiber, a strand of wires or fibers, or more generally, any filiform or tubular element.

What we claim is:

1. Apparatus for accumulating a filiform element having an input of a first speed and an output of a second speed, comprising
   (a) a fixed cylindrical container open at its upper end and having a closed bottom wall, said bottom wall containing a central opening;
   (b) winding means arranged above said fixed container for winding the filiform element traveling at the first speed into layers of coils stacked on said container bottom wall, said winding means winding the filiform element along one of an epicycloid and hypocycloid path; and
   (c) guiding means arranged within said container adjacent said container bottom wall for guiding the output of the filiform element at the second speed, said guiding means directing said filiform element as it is uncoiled from the bottom of said stacked layers of coils through said bottom wall central outlet opening.

2. The apparatus claimed in claim 1, wherein said winding means comprises electromechanical means for moving along said path a first end of a tube above said container, said filiform element sliding inside said tube.

3. The apparatus claimed in claim 2, wherein said filiform element enters a second end of said tube housed in a ball-joint driven by said moving means, said ball-joint being centered on an axis perpendicular to said bottom of said container.

4. The apparatus claimed in claim 1, wherein said winding means comprises means for drawing said filiform element at said first speed, and means for guiding said filiform element towards a perpendicular at the center of the bottom of said container before moving said filiform element along said path.

5. The apparatus claimed in claim 4, wherein said drawing means comprises a pulley and a tensioned belt to sandwich said filiform element on a peripheral portion of said pulley.

6. The apparatus claimed in claim 2, wherein said winding means further comprises means for drawing said filiform element at said first speed, means for guiding said filiform element towards a perpendicular at the center of the bottom of said container before sliding said filiform element inside said tube, and means for slaving said moving means to said first speed determined by said drawing means, thereby laying said filiform element in said container along said path.

7. The apparatus as claimed in claim 1, wherein the inner surface of said bottom of said container comprises grooves having a depth less than the diameter of said filiform element.

8. The apparatus claimed in claim 1, wherein said guiding means is located at the center of said container and is inside said coils of said filiform element winding path.

9. The apparatus claimed in claim 1, wherein said guiding means comprises a first ring fixed to said container bottom, and a second ring substantially located above said container bottom and concentrically surrounding said first ring, said filiform element being unwound by passing through a first gap between said second ring and said container bottom, through a second gap between said rings and through a channel passing through said first ring and said container bottom.

10. The apparatus claimed in claim 9 wherein said first and second gaps have a width that is a few millimeters greater than the diameter of said filiform element.

11. The apparatus claimed in claim 9, wherein said first ring has a convex semicircular axial cross-section opposite said container bottom, and said second ring has an edge with a quarter-circle convex axial cross-section facing said container bottom and said first ring.

12. The apparatus claimed in claim 11, wherein said filiform element is an optical fiber and said convex cross-sections have radii greater than a minimum allowable bend radius of said optical fiber.

13. An apparatus as claimed in claim 9, comprising magnetic means for immobilizing said second ring with respect of said container and said first ring.

14. The apparatus claimed in claim 13, wherein said immobilizing means comprises magnets housed in said first ring and said second ring respectively.

15. The apparatus claimed in claim 13, wherein said immobilizing means comprise magnets housed in said second ring and said container bottom respectively.

16. An apparatus as claimed in claim 9, comprising means for suspending said second ring above said container bottom.

17. An apparatus as claimed in claim 16 wherein said winding means comprises electromechanical means for moving along said path a first end of a tube above said container, said filiform element sliding inside said tube, and said suspending means comprises a shaft perpendicular to said container bottom, mechanical means fixed to said shaft and being freely rotatable concentric with the axis of said shaft and containing a slot through which said tube radially slides, whereby said shaft rotates during movement of said tube along said path, and means for rotatably connecting said shaft with said second ring, whereby said second ring remains stationary during rotation of said shaft.

18. An apparatus as claimed in claim 9, comprising means affording axial displacement of said second ring above said container bottom.

* * * * *